(12) United States Patent
Olszak

(10) Patent No.: US 6,449,048 B1
(45) Date of Patent: Sep. 10, 2002

(54) LATERAL-SCANNING INTERFEROMETER WITH TILTED OPTICAL AXIS

(75) Inventor: Artur Olszak, Tucson, AZ (US)

(73) Assignee: Veeco Instruments, Inc., Tucson, AZ (US)

( * ) Notice: Subject to any disclaimer, the term of this patent is extended or adjusted under 35 U.S.C. 154(b) by 0 days.

(21) Appl. No.: 09/569,131

(22) Filed: May 11, 2000

(51) Int. Cl.[7] .................................................. G01B 9/02
(52) U.S. Cl. ..................................... 356/497; 356/512
(58) Field of Search .............................. 356/497, 512, 356/513, 514, 479, 489, 495

(56) References Cited

U.S. PATENT DOCUMENTS

| | | | |
|---|---|---|---|
| 5,204,734 A | * 4/1993 | Cohen et al. | 356/497 |
| 5,471,303 A | * 11/1995 | Ai et al. | 356/497 |
| 5,646,733 A | 7/1997 | Bieman | 356/376 |
| 5,777,740 A | * 7/1998 | Lacey et al. | 356/495 |

OTHER PUBLICATIONS

G. S. Kino and S. S. Chim, "Mirau correlation microscope," Appl. Opt. 29, 3775–3783, (1990).

* cited by examiner

*Primary Examiner*—Samuel A. Turner
(74) *Attorney, Agent, or Firm*—Antonio R. Durando; Durando Birdwell & Janke, P.L.C.

(57) ABSTRACT

An interferometer scans the sample surface laterally with respect to the optical axis of the interferometric objective. The objective is tilted, so that the sample surface is placed at an angle with respect to the maximum coherence plane of the instrument. By moving the sample stage laterally, at an angle, through a point at a set distance from the objective on the objective's optical axis, rather than vertically along the optical axis, different parts of the object intersect the maximum coherence plane at different times as the surface passes through the coherence plane, the precise time depending on the profile of the surface. When the OPD of a point on the object's surface is greater than the coherence length of the light source, the intensity of light reflected from this point does not produce interference fringes. Therefore, the intensity registered by the detector is approximately constant. However, when the object point enters the zone of coherence, the interference effects modulate the intensity the same way as in a regular VSI procedure. As the object moves along the scanning direction, it also has a relative vertical speed with respect to the objective because of the tilt of the objective's optical axis with respect to the scanning plane; therefore, the lateral scanning motion produces an OPD variation as the vertical scan in a conventional system. As a result, light intensity data are acquired continuously as the test surface is scanned, thus elimination the need for stitching multiple sub-sets of data.

27 Claims, 10 Drawing Sheets

LATERAL-SCANNING INTERFEROMETER WITH TILTED OPTICAL AXIS

BACKGROUND OF THE INVENTION

1. Field of the Invention

This invention is related in general to the field of interferometry and, in particular, to a novel scanning approach based on lateral translation of the sample stage or interferometric objective.

2. Description of the Related Art

Accurate profilometry is a very important component of modern technology. As the art moves towards smaller parts and more accurate manufacturing methods, there is an increased requirement for fast and reliable methods of shape measurement, quality control and process monitoring. Advances in the semiconductor and data storage industries and new technologies, such as MEMS (micro-electro mechanical systems), require measurement resolution in the order of nanometers and ever faster processing.

Among the various measurement methods, optical techniques are preferred because of their non-contact nature, their high accuracy and the three-dimensional surface information they produce. Several optical phenomena have been exploited for this purpose. Depending on the shape, size and material of the test object, these techniques preferentially use structured light, focusing properties of optics, interference of light, etc., to achieve the best possible results in an economical and practical way. Moire' techniques, ESPI (electronic speckle-pattern interferometry), laser scanning, photogrammetry, and interferometry are only few of the many techniques developed for conducting three-dimensional shape measurements. The accuracy of these methods depends on many factors and varies from the sub-nanometer to the millimeter range. For large objects, such as car bodies, mechanical parts, etc., fringe projection, photogrammetry, or ESPI systems are usually utilized. Smaller objects, such as magnetic heads, require better absolute accuracy and methods such as interferometry or confocal microscopy are normally used.

Among these methods white-light vertical scanning interferometry (VSI), also commonly referred to as white-light interferometry or coherence radar, is used for small objects with roughness that does not exceed a few micrometers. The method is based on detection of the coherence peak created by two interfering, polychromatic wavefronts. It has many advantages such as absolute depth discrimination, fast measurement cycle, and high vertical resolution. It has proven to be very effective in measurements of objects with surface dimensions in the range of 15 mm down to sub-millimeter sizes.

Since its early development by Flourney at al. (P. A. Flourney, R. W. McClure and G. Wyntjes, "White-light Interferometric Thickness Gauge," Appl. Opt. 11, 1907–1915, 972), the procedure has been significantly improved and commercially available systems have measurement repeatability of 0.1 nm or better. One of the important advantages of VSI is the ease with which it can be combined with other measurement techniques, such as phase-shifting interferometry (PSI), which are superior in accuracy but lack the scanning depth of VSI. For example, both techniques were combined in an system described as "PSI on the fly" (see U.S. Pat. No. 5,133,601 to Cohen et al.), and in U.S. Pat. No. 5,471,303 to Ai et al., wherein information from PSI is used to refine the height resolution of the VSI technique.

As is well understood in the art of vertical-scanning and phase-shifting interferometry, the optical path difference (OPD) between a test beam and a reference beam is varied in order to make a measurement. This is typically accomplished by shifting either the test surface or the reference surface of the interferometer along the optical axis by a predetermined distance during or between times of acquisition of data frames. The shift is normally carried out in steps or by continuous motion at a known, ideally constant, speed.

In the stepping method, the sample surface (or, alternatively, the reference surface) is moved between data frames and held still during data acquisition; thus, the OPD is kept constant during acquisition of each data frame. In practice, the shift-and-hold motion of the stepping method is mechanically undesirable because a finite amount of time is required for the shifted portion of the apparatus to settle into a static condition, thereby slowing down the process of data acquisition. Therefore, this method is no longer generally preferred in the industry.

In the ramping method, the OPD is varied in a continuous, smooth fashion, typically by scanning either the sample surface or the reference surface at constant speed throughout the measurement sequence. This approach is more common for vertical scanning interferometry and phase shifting because it allows faster measurements than the stepping method.

A typical vertical scanning interferometer 10 is shown in FIG. 1. A test sample or object 12 is placed in an interferometric setup illuminated with a "white" light source, such as an incandescent light bulb or LED 14. The beam from the source, which may be passed through a broadband filter (not shown), is collimated in collimator optics 16 and divided into object and reference beams OB and RB, respectively, using a beam splitter 18. The light reflected from the surface S of the object and from a reference surface 20 is then combined and the resulting image is projected on a CCD camera 22 through appropriate imaging optics 24 for registration and further processing by a computer (not shown).

The contrast of registered fringes, resulting from the interference between the object and reference beams, is proportional to the modulus of the complex degree of the mutual coherence of the wavefronts OB and RB. Since the light source is polychromatic, it has a low degree of time coherence and, therefore, the interference can occur only in a limited space around the coherence plane P defined by a zero optical path difference (OPD).

This property is used for retrieval of the object's shape. The object is scanned along the optical axis of the instrument (referred to as the z direction in the figure) such that different heights pass through the coherence plane. In this limited coherence space the interference fringes become visible as the modulation of intensity along the scanning path, the peak of the fringe contrast corresponding to a vertical position where the OPD is zero. During the scan a number of intensity frames is acquired at defined locations and the intensity from each detector pixel (corresponding to a single point on the object) is analyzed as a function of the object's vertical position. Normally the maximum of the intensity modulation envelope, or its center, defines the relative height of the observed object point. The profile of the correlogram is defined by the equation:

$$I(x,y,z)=a(x,y)+m(x,y)c[z-2h(x,y)]\cos[2\pi w_o z - \alpha(a,y)] \qquad (1)$$

where $I(x,y,z)$ is the intensity at location $(x,y)$ and height $z$ on the sample surface; $a(x,y)$ is the average intensity; $m(x,y)$ is the modulation; $c(z)$ is the envelope function defined by the spectral properties of the light source; $h(x,y)$ is the height of the object; $w_o$ is the mean wavelength of the source; and α(x,y) is the initial phase difference between the object and reference beams. See G. S. Kino and S. S. C. Chim, "Mirau correlation microscope," Appl. Opt. 29, 3775–3783 (1990).

A typical correlogram C from a single pixel of an object obtained by the vertical scanning method is shown in FIG. 2. The high frequency modulating signal arises from the interference of light while the envelope corresponds to the contrast of fringes, i.e., the modulus of the mutual degree of coherence of the interfering wavefronts.

Subsequent data processing is used to retrieve the accurate position of the peak of the envelope. Many algorithms have been devised in the art to detect the location of the maximum. In most cases, the intensity signal detected at the camera 22 is differentiated to remove the DC term and subsequently a center of mass, Fourier analysis, or curve fitting approach is used to perform this task.

Usually the scanning speed of the interferometer 10 is synchronized with the carrier frequency, i.e., the modulation of the intensity signal. Ninety-degree, 120° or 60° intervals are preferred because of their immediate application to other techniques, such as phase methods. Faster scanning speeds (such as every 450°) are also used, but with reduced performance. The total scanning speed is limited by the camera frame rate acquisition and the scanning step size. Typical scanning speeds for commercial products do not exceed 15 $\mu$m/sec.

VSI systems are commonly built on the basis of a microscope; therefore, the field of view is limited to less than about 15 mm. When a larger part needs to be measured, the total area is split into a number of overlapping regions that are measured independently. Subsequently, a stitching technique is implemented to reconstruct the entire surface. (See, for example, U.S. Pat. No. 5,987,189 and U.S. Pat. No. 5,991,461). The disadvantage of this approach is that some areas are measured more than once because overlapping regions are needed for the stitching routines to match adjacent measurements. This requires extra time. In addition, measurement inaccuracies introduce errors into the procedure of stitching the sub-measurements. The approach also carries a risk of producing erroneous waviness in the stitched data set when the mean shape of the object deviates from flat. In such a case the scanning range must also be adjusted to accommodate the total bow of the surface.

In view of these shortcomings of the prior art, it would be very desirable to provide an interferometric profiling approach with the flexibility of operating within an expanded range of sample surface without loss of precision or resolution. This invention provides a novel solution to that end.

BRIEF SUMMARY OF THE INVENTION

One primary goal of this invention is a novel approach to scanning interferometry, especially broadband VSI, that permits the direct measurement of an expanded region of a sample surface without stitching of multiple data sets.

Another important goal of the invention is a broad bandwidth interferometer suitable for direct measurement of an expanded region of the sample surface using a conventional microscope objective and VSI or PSI hardware.

Another goal is a solution that provides substantially uniform and continuous scanning of a sample-surface region of interest.

Still another objective is an approach that is suitable for implementation with all prior-art interferometric arrangements.

Finally, a goal of the invention is the development of a method and apparatus that are suitable for implementation by modifying existing interferometric surface profilers.

Therefore, according to these and other objectives, the invention consists of scanning the sample surface laterally with respect to the optical axis of the interferometric objective. The optical axis of the instrument is tilted, so that the sample surface is placed at an angle with respect to the maximum coherence plane of the instrument. By moving the sample stage or the objective laterally, at such an angle, so that the stage passes through a point at a set distance from the objective on the objective's optical axis, rather than vertically along the optical axis, different parts of the object intersect the maximum coherence plane at different times as the surface passes through the coherence plane, the precise time depending on the profile of the surface. When the OPD of a point on the object's surface is greater than the coherence length of the light source, the intensity of light reflected from this point does not produce interference fringes. Therefore, the intensity registered by the detector is approximately constant. However, when the object point enters the zone of coherence, the interference effects modulate the intensity the same way as in a regular VSI procedure. As the object moves along the scanning direction, it also has a relative vertical speed with respect to the objective because of the tilt of the objective's optical axis with respect to the scanning plane; therefore, the lateral scanning motion produces an OPD variation as the vertical scan in a conventional system. As a result of the novel scanning approach of the invention, light intensity data are acquired continuously as the test surface is scanned, thus elimination the need for stitching multiple sets when elongated objects are tested.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

Figure 1:
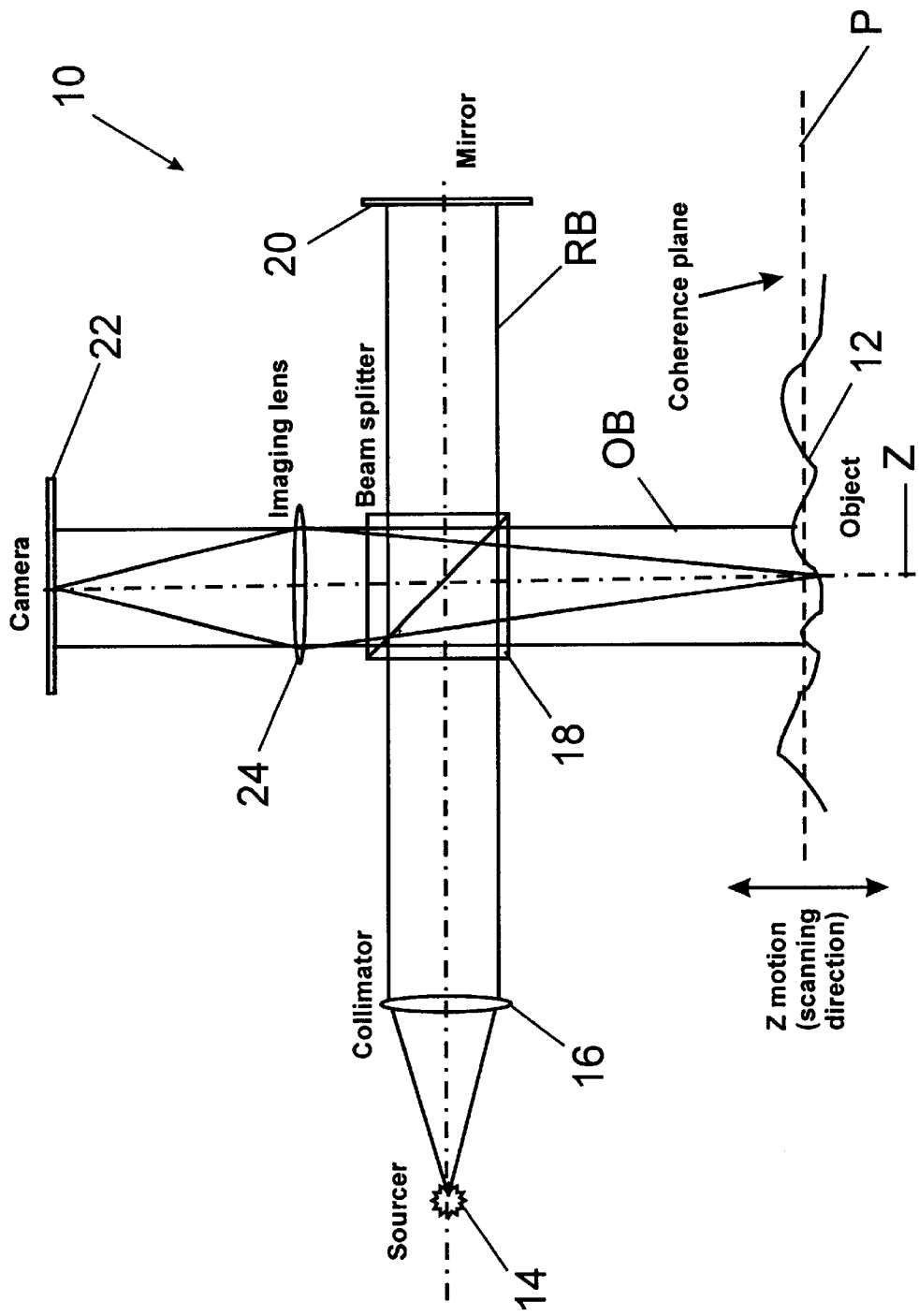
FIG. 1 is a simplified schematic representation of a conventional white-light vertical-scanning interferometric system in Twymann-Green configuration.
Figure 2:
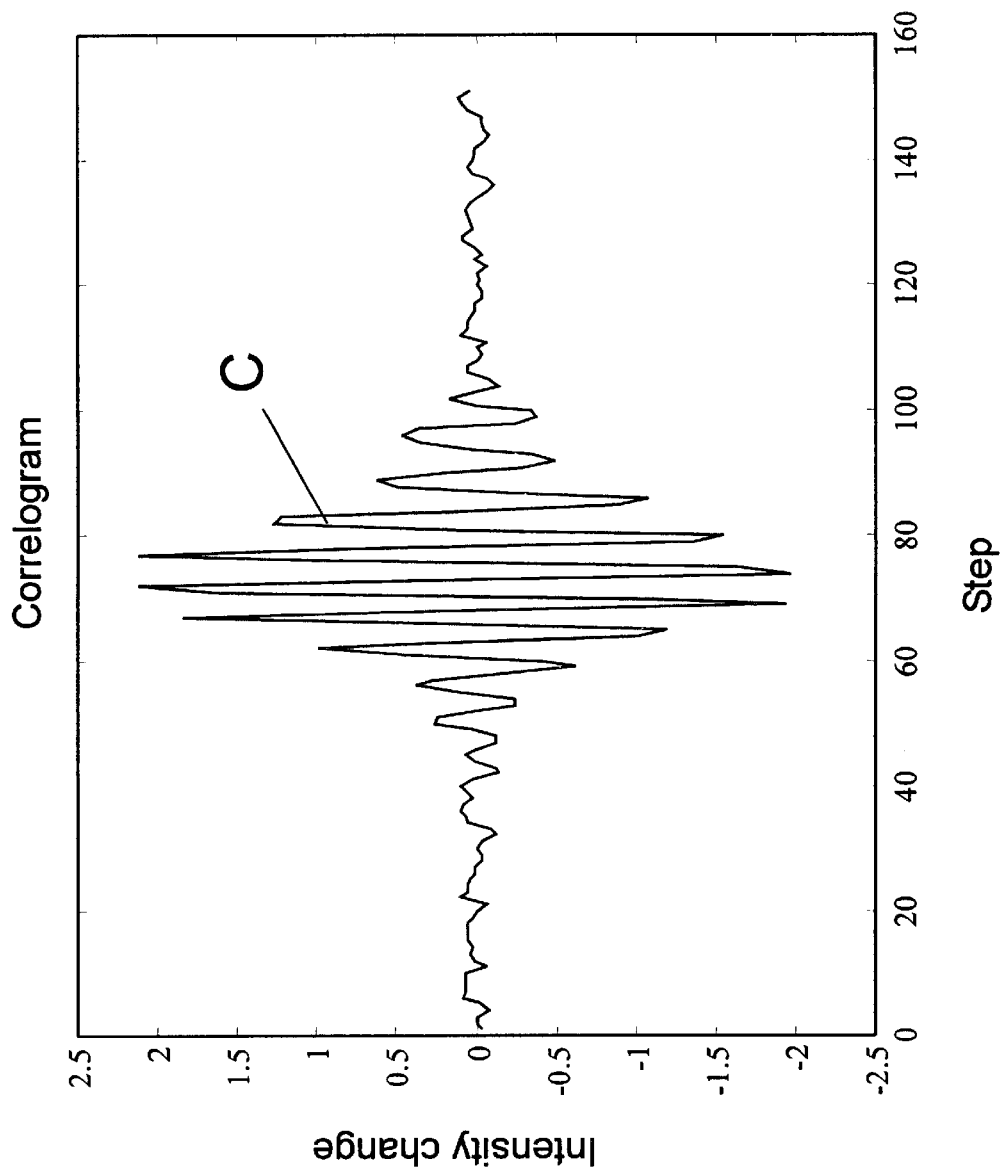
FIG. 2 is an exemplary correlogram of light intensity modulation received by a single pixel of a detector camera during a typical vertical scan.

The invention is based on the realization that the effective testing range of an interferometer can be expanded by continuously scanning a tilted sample surface or fixture across the objective's field of view. By tilting the objective's optical axis with respect to the sample stage and by scanning the sample across the tilted coherence plane of the instrument, the resulting relative vertical scan produces a sequence of interferograms equivalent to conventional vertical-scanning interferometry. The invention is described in terms of white-light interferometric apparatus, but it is understood that any broadband light suitable to practice VSI interferometry would be appropriate for the invention. Moreover, as one skilled in the art would readily understand, the invention could also be adapted for implementation to PSI measurements, both with narrow- and broad-bandwidth light, subject only to successful resolution of the $2\pi$ ambiguity problem associated with all PSI measurements. Therefore, the scope of the invention is intended to be as broad as supported by the use of a particular wavelength band for VSI-as well as PSI-type measurements. It is also understood that the term VSI is intended to refer to all interferometric analysis techniques used in conventional VSI scanning, regardless of the fact that the invention does not involve conventional vertical scanning.

For the purpose of reference only, the x coordinate in this disclosure is intended to refer to the straight line scanning direction of a flat sample stage, which is described as lying on the x,y coordinate plane. X direction, scanning direction, and lateral direction are used interchangeably to refer to the direction of motion of the sample stage relative to the objective, or vice versa, during LSI scanning. The z coordinate is perpendicular to the x,y plane of the sample stage and refers to the ordinary direction of scanning of conventional VSI and PSI devices. The term axial direction refers to the direction of the tilted optical axis of the objective of the invention; that is, the direction used by the method of the invention to track shifts in the position of points on the test surface that produce changes in OPD (optical path difference) and corresponding changes in interference patterns seen by the detector. Since translations of a surface point in the scanning direction produce corresponding shifts in the axial direction as well, the axial direction is also referred to as the direction of effective scanning. Finally, the term detection direction refers to the direction of a line or row of pixels in the detector positioned preferably in parallel or coplanarly with the trajectory traced by a point on the sample surface during a scan in the scanning direction, so that the row of pixels is aligned to detect and track the light reflected from that point during the scan.

It is noted that lateral scanning is intended to refer to the relative motion of the sample stage with respect to the interferometric objective, or vice versa, so that various contiguous portions of the sample surface's profile successively cross the optical axis of the objective during the scan. In some particular applications designed to profile surfaces having non-flat geometries, the sample stage may not be flat or the sample itself may be scanned directly without the support of a fixture, such as when rollers are profiled. Thus, in such cases, lateral scanning is intended to refer to the curvilinear motion of the sample surface through the optical axis of the interferometric objective, or vice versa. Accordingly, the lateral, scanning or x direction, as defined above, in these cases corresponds to the straight-line direction tangent to the curve defined by the motion of the sample stage at the point of intersection with the optical axis. In practice, given the relatively small fields of view used, lateral scanning will normally approximate the x direction for the purposes of the invention even when a curvilinear surface is profiled.

The terms white, broadband, broad bandwidth, polychromatic, and low coherence light are used interchangeably, as well understood in the art, to refer to an illumination source having a relatively wide frequency spectrum. Typically, any light source that would permit detection of a peak of modulation is considered broadband in the art. Similarly, the terms monochromatic, narrowband, narrow bandwidth, and high coherence are used interchangeably to refer to an illumination source with which the peak of modulation cannot be detected, such a laser light. From the present disclosure, though, it is clear that these distinctions are not essential to the practice of the invention. Therefore, these distinctions, while significant for the description of preferred embodiments, is not intended and should not be used to limit the scope of the invention.

Figure 3:
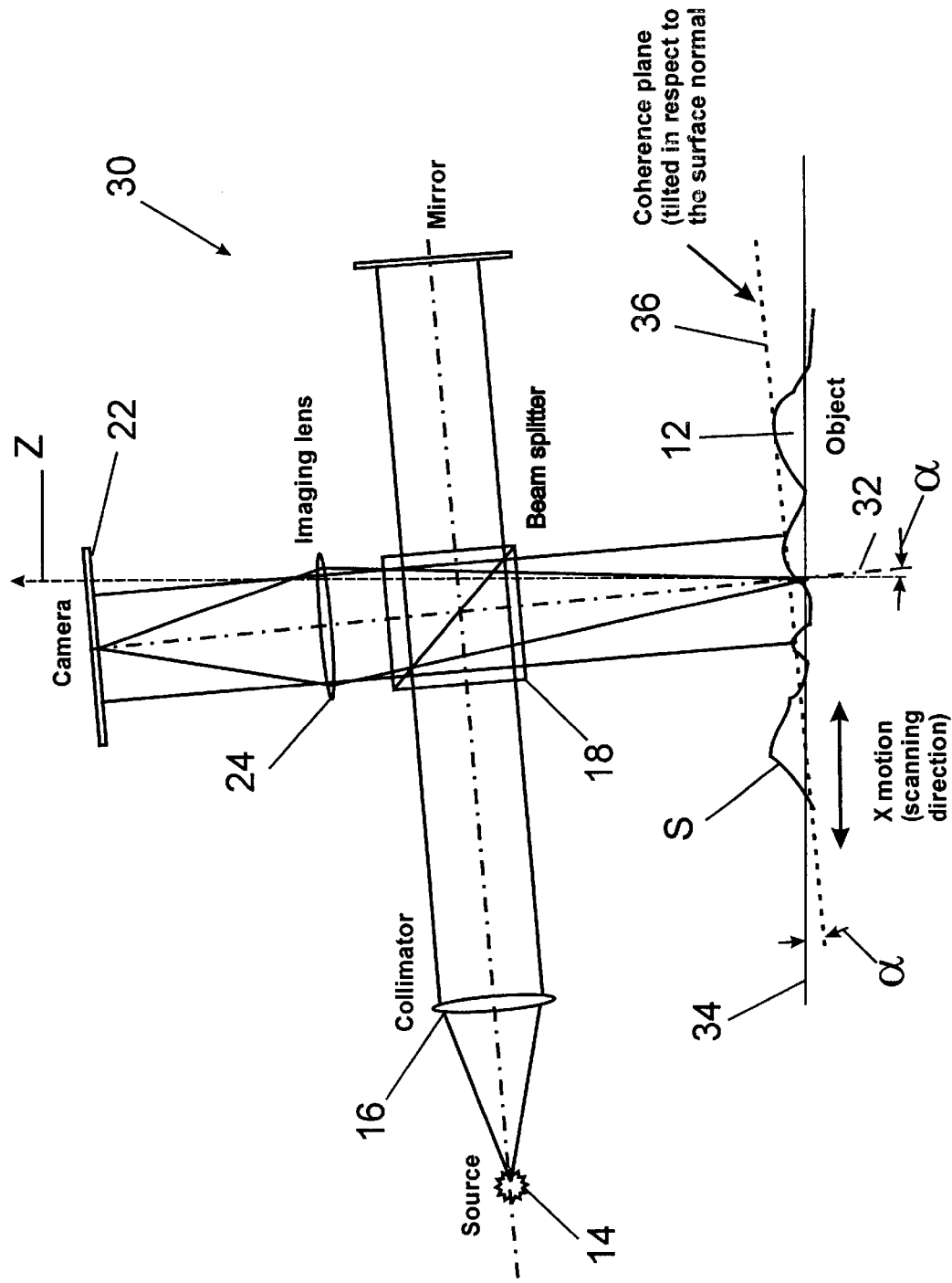
FIG. 3 is a schematic of a lateral-scanning interferometer according to the invention based on a Twymann-Green interferometer.

Referring to the drawings, wherein like reference numerals and symbols are used throughout to designate like parts, FIG. 3 is a schematic illustration of a lateral-scanning interferometer 30 according to the invention based on a Twymann-Green configuration. According to the invention, the optical axis 32 of the interferometer 30 is tilted by a predetermined angle a with respect to the z axis. That is, the optical axis 32 is not parallel to the direction of the z axis, as is the case in conventional VSI devices. As a result, the maximum coherence plane 36 of the instrument is tilted as well and intersects the x,y plane 34 of the sample stage (or other support fixture) at the same angle $\alpha$ (illustrated in 2-dimensional view only for simplicity, normal to the plane of the figure). If the sample surface S is moved laterally in the x direction (instead of vertically along the z axis), it passes through the coherence plane 36 and, because the coherence plane is tilted, different parts of the object intersect it at different times which also depend on the profile of the surface (that is, the relative height in the optical-axis direction of each point intersecting the maximum coherence plane).

Figure 4:
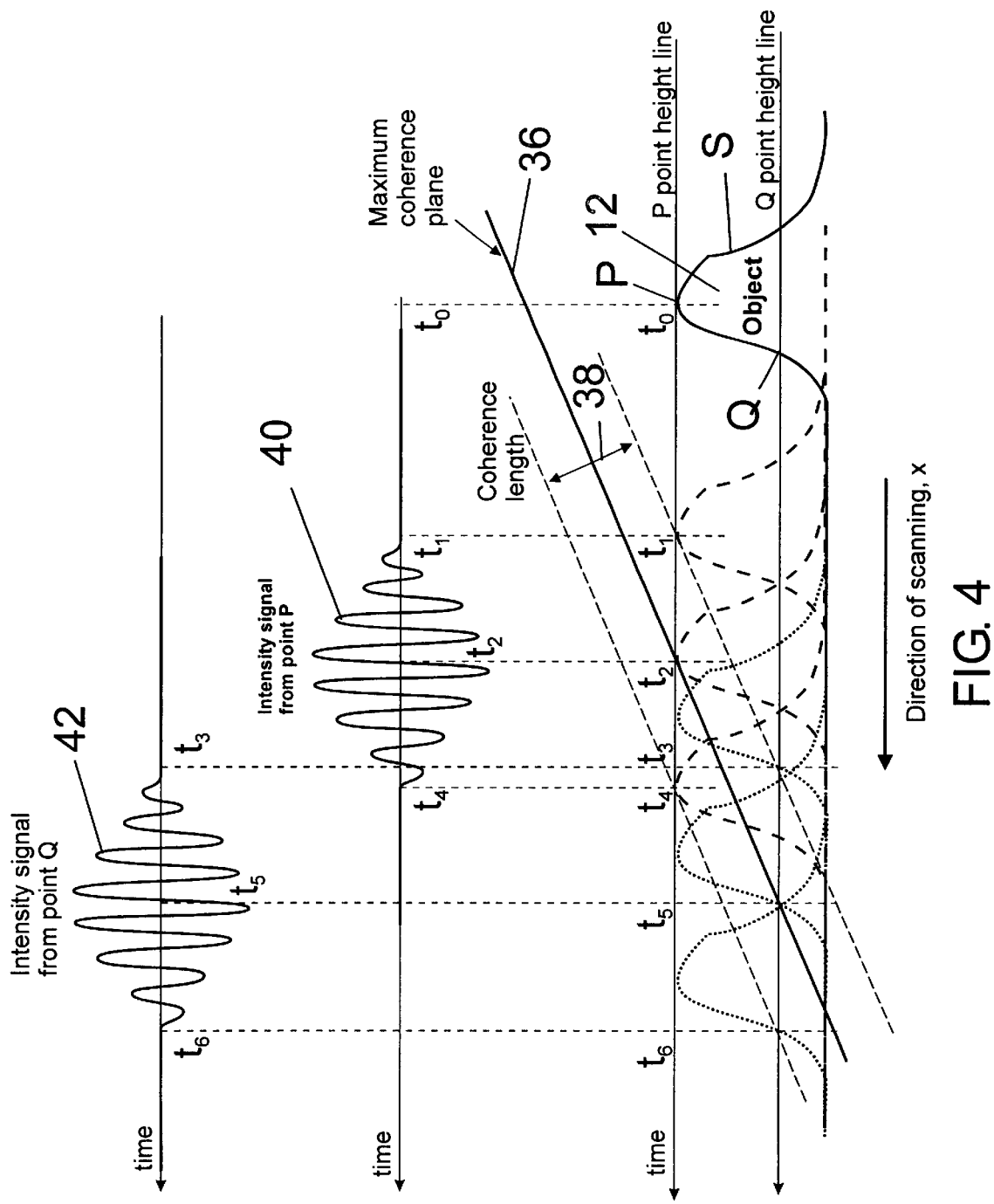
FIG. 4 illustrates two points on the surface of a sample passing through the coherence space of the interferometer of the invention during a lateral scan and the timing of the intensity signals generated by each point.

FIG. 4 illustrates two points (P and Q) on the surface S of a test sample passing through the space corresponding to the coherence length 38 of the interferometer 30 of the invention and the timing of the intensity signals generated by each point during a lateral scan. As the test object 12 is scanned through the tilted coherence space 38, different parts (such as points P and Q, for example) intersect at different times. As the figure clearly illustrates, the exact time is not only a function of the respective positions of the points within the surface S, but also a function of the respective heights of the points; that is, their position in the z direction, which in turn has a corresponding position in the axial direction of effective scanning. When the OPD of a point on the sample's surface is larger than the coherence length 38 of the light source, the intensity of the light reflected from this point does not produce interference fringes. Therefore, the intensity registered by the detector 22 is approximately constant, as illustrated by the straight-line portions of the intensity-signal plots 40 and 42 in FIG. 4.

The plots 40 and 42 are exemplary intensity-signal correlograms as would be detected from points P and Q, respectively, during their lateral-scan motion across the field of view of the instrument 30. During the time period between t0 and t1, the intensity detected from both point locations is constant. At time t1, point P enters the coherence length 38 of the light source and the intensity from this location is modulated until it moves out of the coherence space at time t4. Similarly, the light intensity from point Q is modulated from t3 through t6. Thus, when a point on the test surface enters the zone of coherence, the interference-effect variations caused by the axial component of the lateral scan modulate the intensity the same way as during a regular VSI measurement (i.e, during times t1 through t4 for point P, and t3–t6 for point Q). As the test object moves along the x direction, it also has a relative axial speed with respect to the interferometric objective (that is, it produces a change in OPD) and the lateral scanning provides the same effect as a vertical scan in a conventional VSI system.

According to the invention, a number of images is acquired at known x locations during the scan of the object. In the preferred embodiment of the invention, the camera 22 is oriented in such a way that lines of pixels are parallel to the x direction (i.e., the plane of the detector is parallel to the plane of the sample stage, with detector rows parallel to the scanning direction and detector columns parallel to the y direction). As a result of this alignment, points on the surface S can be followed along a pixel line during their motion through the field of view. The speed at which the test object moves in the camera plane depends on the speed of the lateral scan and the magnification of the system, so that it is possible to track each point on the surface S between consecutive frames. By combining the knowledge about the scanning speed, the direction of scanning, and the modulation of the detected intensity signal from a plurality of points on the sample surface (typically each point representing an area corresponding to a detector pixel, as in conventional profilometry), it is possible, as would be easily understood by one skilled in the art, to reconstruct the surface height in a continuous way using modified interferometric analysis techniques. In essence, correlograms are derived and analyzed in terms of axial shifts caused by the lateral scanning of the invention, rather than in terms of vertical shifts produced by conventional vertical scanning. Thus, the computational techniques required to practice the invention are equivalent to all known VSI procedures (or, similarly, to PSI techniques, if LSI is implemented by phase-shift measurements). Accordingly, they can be easily implemented by those skilled in the art without need for further detailed description.

Therefore, an advantageous aspect of the invention is the fact that the instrument 30 of the invention utilizes no axial scanning mechanism apart from the focusing motion of the microscope. The only direction of scanning motion is lateral; accordingly, the term lateral-scanning interferometer (LSI) has been adopted for the concept.

In view of the scanning approach of the invention, the total height measurement range of LSI is defined by the number of lines in the detector and the tilt of the instrument with respect to the test-surface normal (i.e., the angle between the optical axis 32 and the z direction). It is well known that the light reflected from the surface S forms interference fringes with a period of one fringe per $\lambda/2$ of surface height in the direction of the optical axis. Thus, in order to keep a fringe phase difference equal to a desired $\Delta\Phi$ between consecutive pixels aligned with the x-direction scan, the tilt must fulfill the following relationship between the wavelength of the light source and the axial shift p of a surface point produced by the scan along the optical axis of the objective (that is, p is the axial distance that corresponds to the desired $\Delta\Phi$):

$$p = \frac{\lambda \Delta\Phi}{2(360°)}. \quad (2)$$

Assume, for example, that a tilt angle $\alpha$, designed to produce a 90° phase difference between consecutive pixels along a detection direction, is selected (e.g., in order to provide direct comparisons with VSI). For the case of $\Delta\Phi=90°$, the axial shift p produced between consecutive pixels must be $\lambda/8$, which, for a mean wavelength of 640 nm, corresponds to 80 nm of axial height.

Since the height difference is introduced by tilting the instrument, the required tilt $\alpha$ can then be calculated simply using the equation:

$$\alpha = \arcsin\frac{p}{Sx}, \quad (3)$$

where Sx is the effective pixel spacing in the sample space along the x direction (that is, the distance along the lateral scan associated with an axial shift p during a scanning step corresponding to one pixel). Since the tilt angle required to practice the invention is relatively small (in the order of single degrees), arcsin(p/Sx) in practice is effectively approximated by p/Sx. The sign of the tilt and the scanning direction define the sign of the profile height.

Table 1 below illustrates total height measurement ranges for different CCD camera resolutions currently available in the art. The values were calculated using a 90° step between pixels with $\lambda=640$ nm. The first dimensions indicate the resolution of the camera in the scanning direction.

TABLE 1

| Camera type: | 480 × 736[a] | 1024 × 1024[b] | 240 × 320[c] | 100 × 736[d] |
|---|---|---|---|---|
| Range: | 38.4 μm | 81.9 μm | 19.2 μm | 8 μm |

[a]Standard NTSC video camera resolution.
[b]High resolution camera, e.g., Kodak Megapixel.
[c]Standard NTSC camera at half resolution.
[d]Partial scan camera, e.g., Pulnix TM-6710 set in partial scan mode of 100 lines.

Figure 5B:
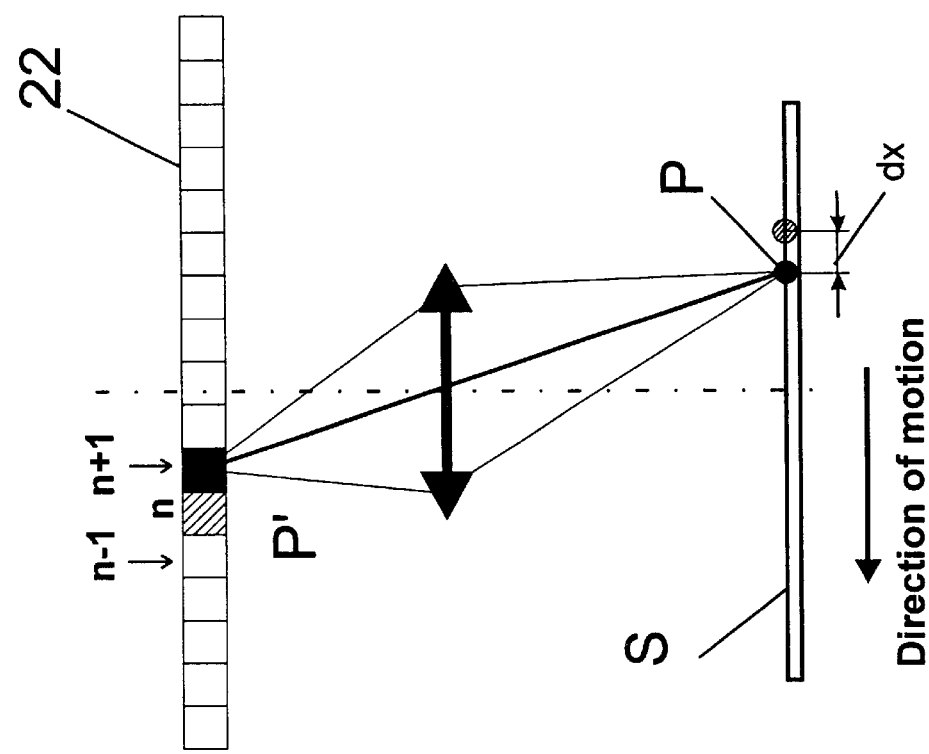
FIGS. 5A and 5B illustrate the imaging of a point of the sample surface onto successive pixels of the CCD camera as the sample is scanned laterally through the coherence place of the instrument.
Figure 5A:
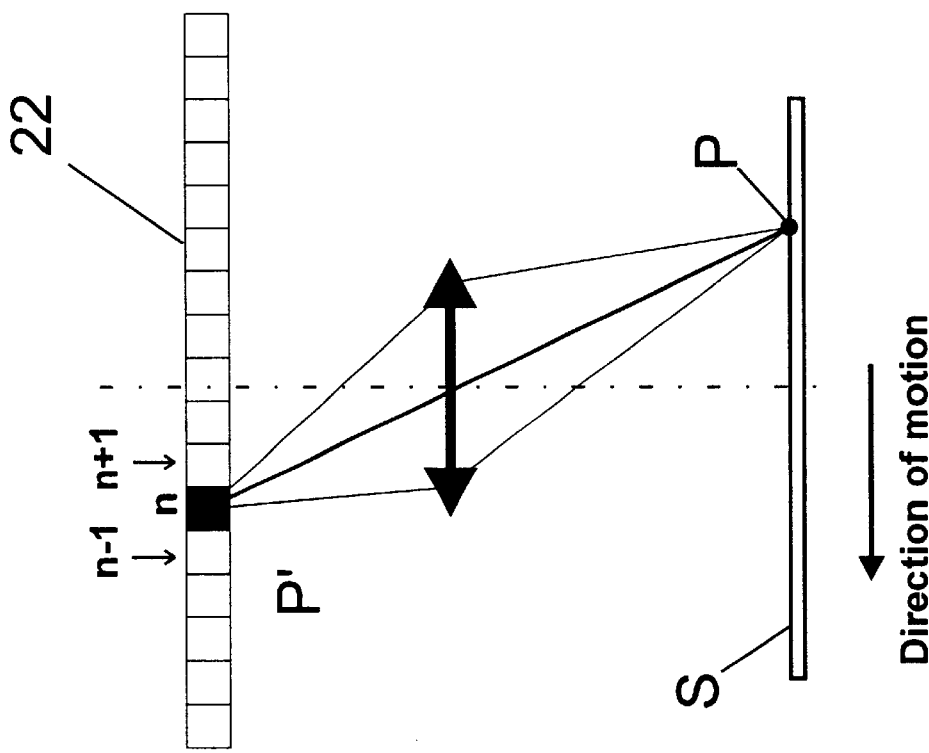

It is understood that the lateral scanning speed must be matched with the camera pixel spacing and the magnification of the instrument for tracking of the signals produced by test-surface points during scanning. Therefore, the scanning speed is preferably chosen in such a way that the sample surface's motion in the camera plane over a period of one frame of acquisition matches the pixel size of the camera in the direction of scanning. Thus, each point on the surface S moves one pixel on the camera between frames. The concept is illustrated in FIG. 5A, showing point P on the sample surface S being imaged onto pixel n in the plane of the CCD camera 22 (point P'). During the time elapsed between frames, the sample stage moves the surface S a distance dx (see FIG. 5B), so that the image of the point P is now projected onto the next adjacent pixel, n+1. (The previous positions of points P and P' are shown in gray for clarity.) It is noted that the plane 34 of the sample stage and the plane of the camera 22 are preferably parallel to each other (as illustrated for simplicity in FIGS. 5A and 5B), but different alignment configurations could be used as well with appropriate corrections depending on the exact optics of the instrument. In all cases, a known relationship will exist between increments of motion dx in the scanning direction x and spatial separation between pixels in the camera 22, as illustrated in simple form in FIGS. 5A and 5B. It is clear that the crucial point is the ability to track the motion of a point of interest on the test surface and correlate it with a corresponding motion of its image in the detector plane, regardless of the type of detector used and/or the particular geometric relationship between the detector and the sample stage.

The speed of the sample stage, Vx, required to maintain synchronization between the motion of the stage and pixel-step camera detection along a corresponding line of pixels (i.e, each frame coincides with a scan step corresponding to one pixel spacing) can be calculated using the equation:

$$V_x = FS_x = \frac{FS_{cx}}{M_x}, \quad (4)$$

where F is the frame rate of the camera; $S_x$, defined above, is the effective distance in the x direction of scanning corresponding to one pixel spacing in the camera; $S_{cx}$ is the spacing between pixels aligned with the x direction in the camera; and $M_x$ is the optical magnification of the instrument in the x direction.

Table 2 below summarizes various LSI stage speeds required for synchronization with consecutive pixel sampling for different camera frame rates and optical magnifications commonly used in the art. The data are a comparison of LSI scanning speeds for different frame rates using the optical magnification options of a WYKO® NT-2000 profilometer.

TABLE 2

| magnification | pixel spacing $\mu$m | 30 fps[a] $\mu$m/s | 60 fps[b] $\mu$m/s | 262 fps[c] mm/s | 350 fps[d] mm/s | 955 fps[e] mm/s |
|---|---|---|---|---|---|---|
| 1.5X | 6.5 | 195 | 390 | 1.70 | 2.28 | 6.21 |
| 2.5X | 3.9 | 117 | 234 | 1.14 | 1.37 | 3.72 |
| 5x | 2.0 | 60 | 120 | 0.52 | 0.70 | 1.91 |
| 10x | 1.0 | 30 | 60 | 0.26 | 0.35 | 0.96 |
| 20x | 0.5 | 15 | 30 | 0.13 | 0.18 | 0.48 |

[a]Standard NTSC video camera frame rate.
[b]Double frame rate, e.g., Cohu 6600.
[c]Fast acquisition camera, e.g., Dalsa D6-0512.
[d]Partial scan camera, e.g., Pulnix TM-6710 set in partial scan mode of 100 lines.
[e]Fast acquisition camera, e.g. Dalsa D6-0256.

As would be well understood by one skilled in the art, the tilt of the optical axis in the instrument 30 of the invention defines the scaling factor required for the calculation of surface height. Having selected, for example, a 90° phase difference between consecutive columns of pixels, as discussed above, the following procedure was used to properly adjust the tilt of the instrument in order to test the approach of the invention. The objective was focused on a flat smooth surface parallel to the stage plane. Thus, the tilt of the VSI objective produced equidistant straight vertical fringes. When no optical bandpass filter was used, about 8–9 fringes were visible. It is known that the period of such white-light fringes is related to the tilt of the objective and can be used as an indicator. Thus, the Fourier transform on horizontal cross-sections of the intensity image acquired from the camera was used to detect the location of the peak of the power spectral density of the spectrum. The tilt was then adjusted until the peak location was found to correspond to 4 pixels per fringe period. An average of 50 lines of intensity profile was taken in order to minimize the influence of intensity noise on the peak detection process. The same procedure could be carried out for a narrower bandwidth filter in order to increase the number of visible fringes; however, in that case care must be taken to use filters with the same mean wavelength both for calibration and measurement purposes in order to prevent the introduction of a systematic error in the measurement.

Figure 6:
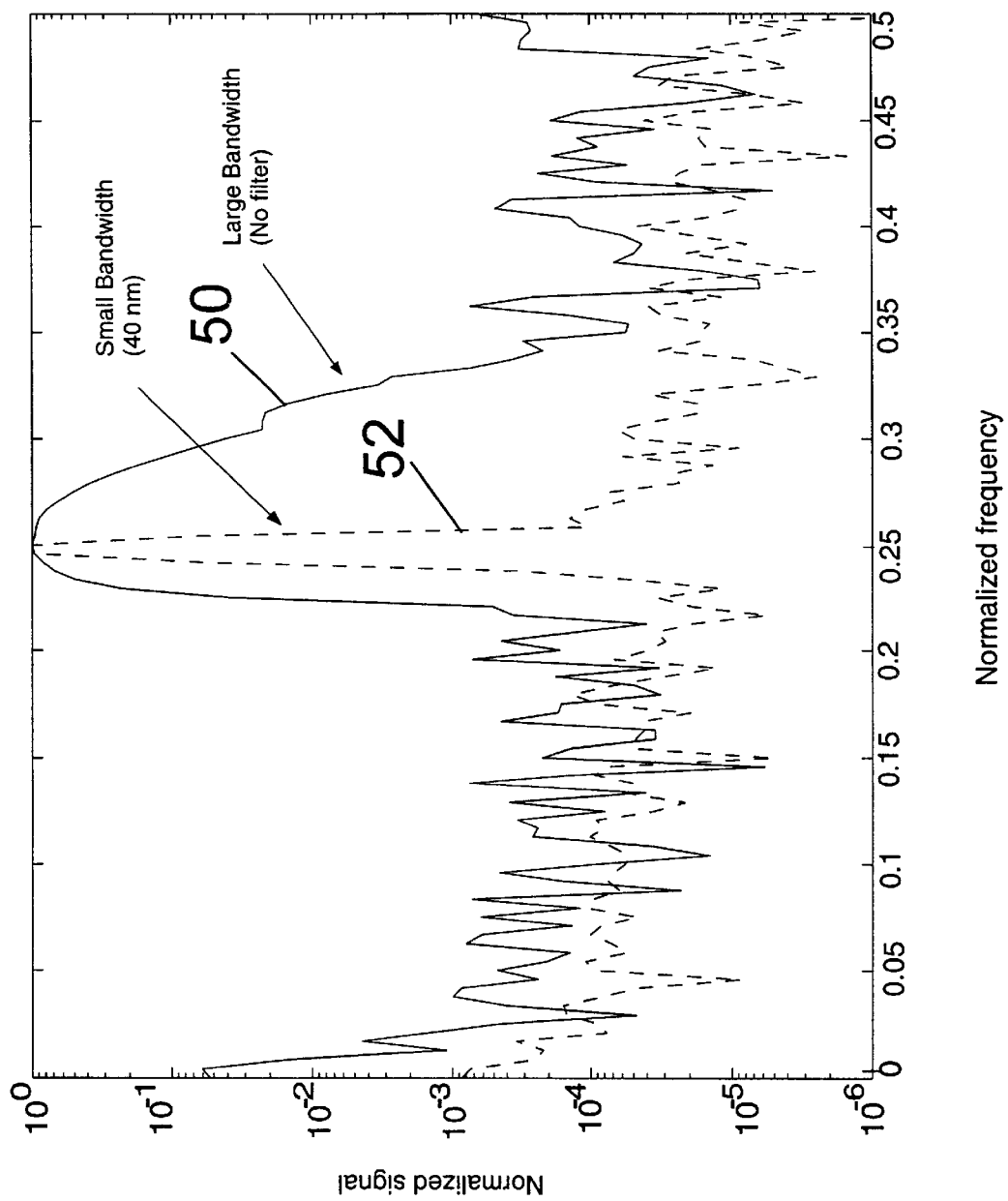
FIG. 6 illustrates power spectral-density graphs of intensity profiles with no filter and with a 40-nm bandwidth filter.

FIG. 6 illustrates the results of an example of calibration. The power spectral-density graph 50 (solid line) of intensity profiles corresponds to white light with no filter; while the graph 52 (dashed line) corresponds to light produced with a 40-nm bandwidth filter. The results were averaged over 50 lines. The large bandwidth light naturally produced a much wider spectrum; therefore; the precision of peak detection was lower. The normalized frequency of 0.25 shown in the graph's abscissa corresponds to 4 pixels per fringe period, as designed.

It is clear that a calibration carried out using a narrower band of wavelength yields a sharper peak in the frequency domain, found to be accurate to about 40 nm over 8.48 $\mu$m of step height. Similar results were obtained for higher magnifications. For small magnifications, such as 1.5x, and a pixel spacing equal to 6.5 $\mu$m, the required tilt for a four-pixel fringe period is $1.2 \times 10^{-2}$ rad. Magnification is defined in the art as the ratio of pixel spacing to effective pixel spacing (i.e., Sx when $\alpha$=0). Thus, as the magnification of the objective increases, the effective pixel spacing Sx decreases (the same qualitative relationship exists even for non-zero $\alpha$) and, therefore, the tilt of the instrument must be increased. During several tests, it was possible to fulfill the tilt condition defined by Equation (3) up to a magnification of 20x. Beyond this value the required tilt was out of range of the tip-tilt head of the instrument.

Note that at higher magnifications the working distance of the objective decreases while the required tilt angle increases. Thus, mechanical design of the objectives may prevent using the method of the invention with objectives with a very small working distance, such as 50× or 100×.

The next important step in the calibration of the instrument involves the alignment of the sample stage. As explained above, the stage's speed and direction of motion must be adjusted to match the orientation and frame rate of the camera. The procedure carried out for testing the invention relies on the correlation between data collected from of a known pattern placed on the sample stage before and after displacement by a known number of frame acquisitions. For that purpose, letters etched on a step-height standard were used. For example, two images of the letter A, positioned on the moving stage separated by 200 frames, were collected and the stage speed was adjusted until the correlation distance between the images was exactly 200 pixels. This simple routine proved to be very reliable and accurate. A longer distance could be used in equivalent fashion in order to further increase the reliability of stage-speed calibration. The same procedure was used to align the stage motion with the camera orientation in the y direction, which was achieved by ensuring that the letter A image would not be distorted by such a potential misalignment during the 200-pixel scan.

The invention was tested in experiments run with a modified, commercially available WYKO® NT-2000 VSI profiler made by Veeco Metrology of Tucson, Ariz. The instrument was equipped with a set of objectives with different magnifications ranging from 1.5× to 50× and a field-of-view changer with settings of 0.75×, 1× and 2×. The CCD camera in the instrument was a standard NTSC type detector with a resolution of 480 pixels in the x (scanning) direction and 736 pixels in the y direction (perpendicular to the stage motion). The instrument had standard X-Y translation and tip-tilt stages. The frame rate of the camera was 30 Hz. Although the instrument allowed for setting of custom filters to adjust the bandwidth of the light source, no filters were used, which resulted in a coherence length of about 4 μm.

Figure 7:
FIG. 7 illustrates a calibration measurement of an 8.48 $\mu$m step.

In order to estimate the repeatability and accuracy of the invention, several measurements were made of a standard-height test surface with a known step of 8.48 μm. First, the repeatability of the system was assessed by running 10 consecutive measurements and computing the average and the mean of the measured step height. The values obtained were an average of 8.52 μm of step height with 6 nm of standard deviation. The results of these measurement of step height are shown in image form in FIG. 7. Note that the total peak-to-valley (PV) value on the legend is slightly larger than the step height (6.86+2.57=9.43 μm instead of 8.48 μm) because of a few deeper pixels in the edge area.

In order to estimate the noise of the system, a smooth mirror surface, calibrated to have less than 2 nm $R_a$ roughness using a more accurate PSI procedure, was measured several times. Ten measurements produced an average of 6 nm $R_a$ roughness with a repeatability of 2 nm $R_a$.

Figure 8:
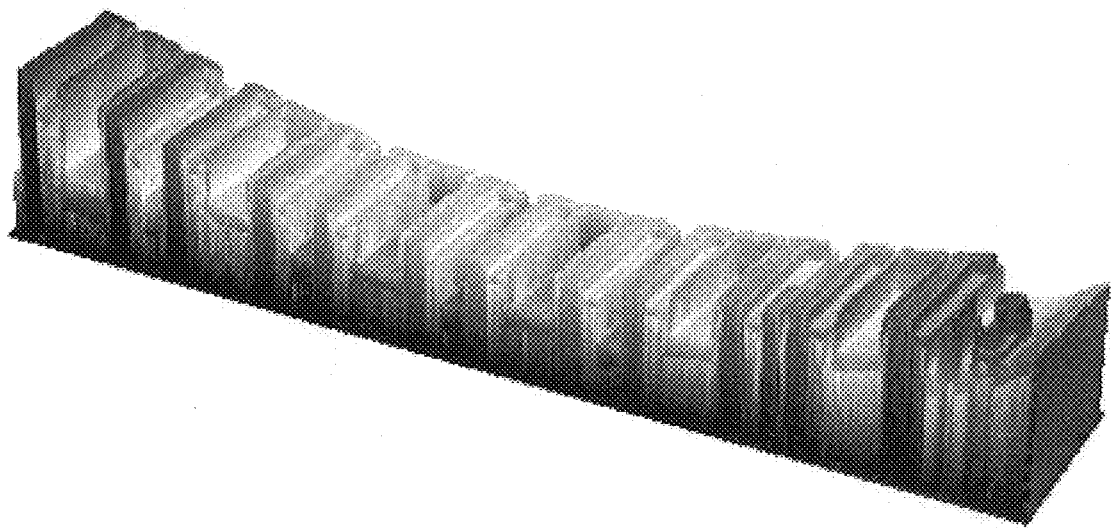
FIG. 8 is a surface profile map of a magnetic head slider bar obtained using the LSI (lateral scanning interferometry) setup of the invention.

Several surfaces for which the full advantage of the method of the invention is clearly evident were also measured. one example was a magnetic-head slider bar with dimensions of approximately 1 mm by 7 mm and a total height variation of about 8 μm. The resulting profile is shown in image form in FIG. 8. The measurement was taken using the half resolution mode of the camera (320×240 pixels). At a frame rate of 30 fps and a total magnification of about 2.5×, the measurement time was 30 sec. The surface profile of FIG. 8 illustrates the ability of the procedure to also measure the overall bow of the surface, which would be difficult to reproduce accurately using prior-art stitching procedure.

Some of the potential error sources of an LSI procedure were also analyzed. Since the tilt of the measurement head defines the scaling factor used in the height measurements (that is, the relationship between axial and vertical distances), which provides the necessary equivalence to the vertical scanning step in conventional VSI, any error related to tilt may be crucial to good measurements. There are two main sources of errors associated with tilt: miscalibration and time drift. Miscalibration results in a systematic error of the height reading. The dependency is linear and can be easily compensated by introducing a correcting scaling coefficient. Test measurements showed that miscalibration of the tilt resulted, for example, in about 40 nm height difference in a measurement of a 8.48 μm step, which corresponds to $5.7 \times 10^{-5}$ rad of angle error. Accordingly, the measurement results were appropriately corrected.

Time drift of tilt results in degrading repeatability of the instrument and predicting it is complicated, but time stability of the objective's tilt can be improved simply by providing a reliable locking mechanism. It is noted that the instrument is insensitive to tilts in the y direction. A small tilt drift of the surface in the x direction also has a negligible impact on the quality of the measurements; however, it causes a change of the envelope length of the signal in relation to the corresponding number of image frames. Accordingly, some peak detection algorithms can be sensitive to this parameter and proper choice of data processing is important.

Figure 9:
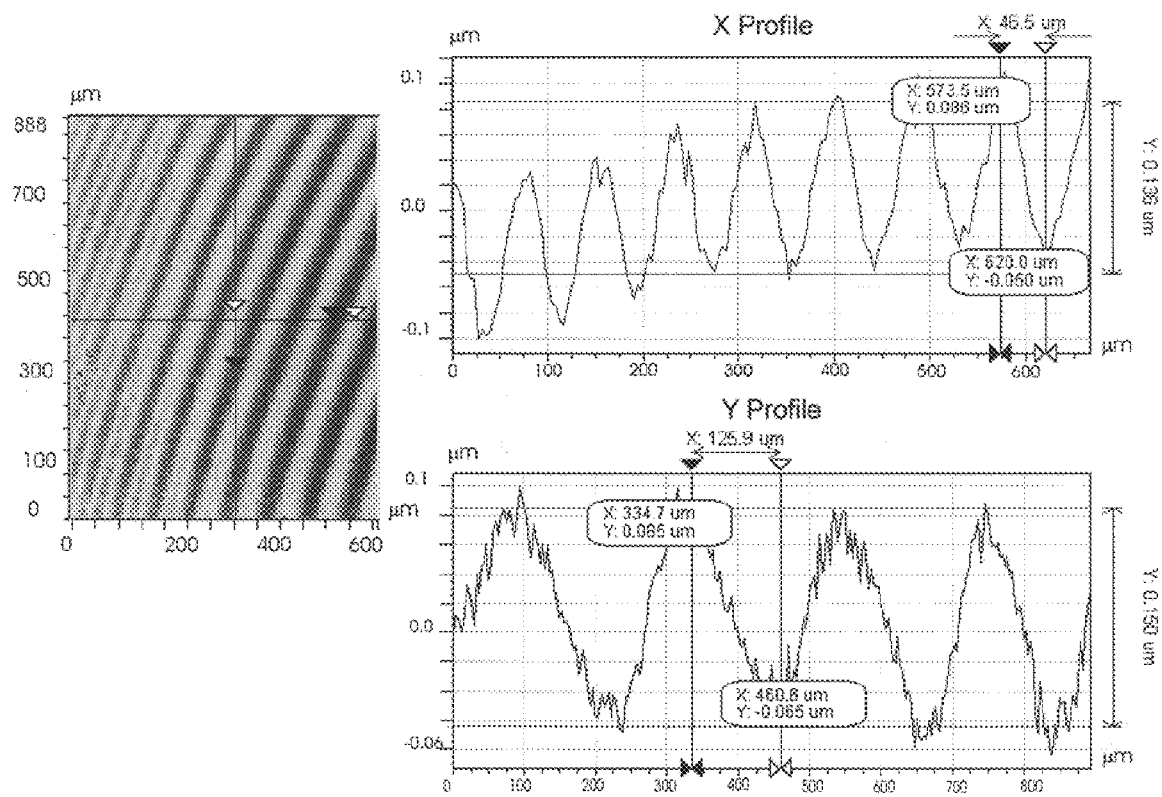
FIG. 9 illustrates the ripple results produced by under-sampling of the fringes.

Moreover, as the tilt angle of the test surface increases, additional factors must be taken into account. For example, the intensity of modulation read from each single pixel can be affected if the tilt causes the Nyquist sampling frequency to be approached. It can cause a decrease in signal amplitude and, for even larger tilt values, it can produce aliasing and ripple in the height profile. A sample of a measurement with undersampling of fringes is shown in FIG. 9. The amplitude of the error in this example is in the order of 150 nm, as shown in the vertical and horizontal cross-sections on the right side of the graphs.

It is also worth noting that the optical system of the invention is not symmetrical with respect to the sample-surface normal, so that its slope handling capabilities is different for ascending and descending surfaces. This asymmetry can be neglected for small magnifications, but for higher magnifications it should be considered during measurement setup.

The stability of the scanning speed and its proper choice of value are essential parameters for good quality measurements. The method relies on accurate correlation of the signal read from the camera pixels with the physical location of a point on the object's surface along its scan direction. As the points are tracked along the lateral scanning direction, any deviation of the speed or direction of the object motion will result in degradation of the results.

Figure 10:
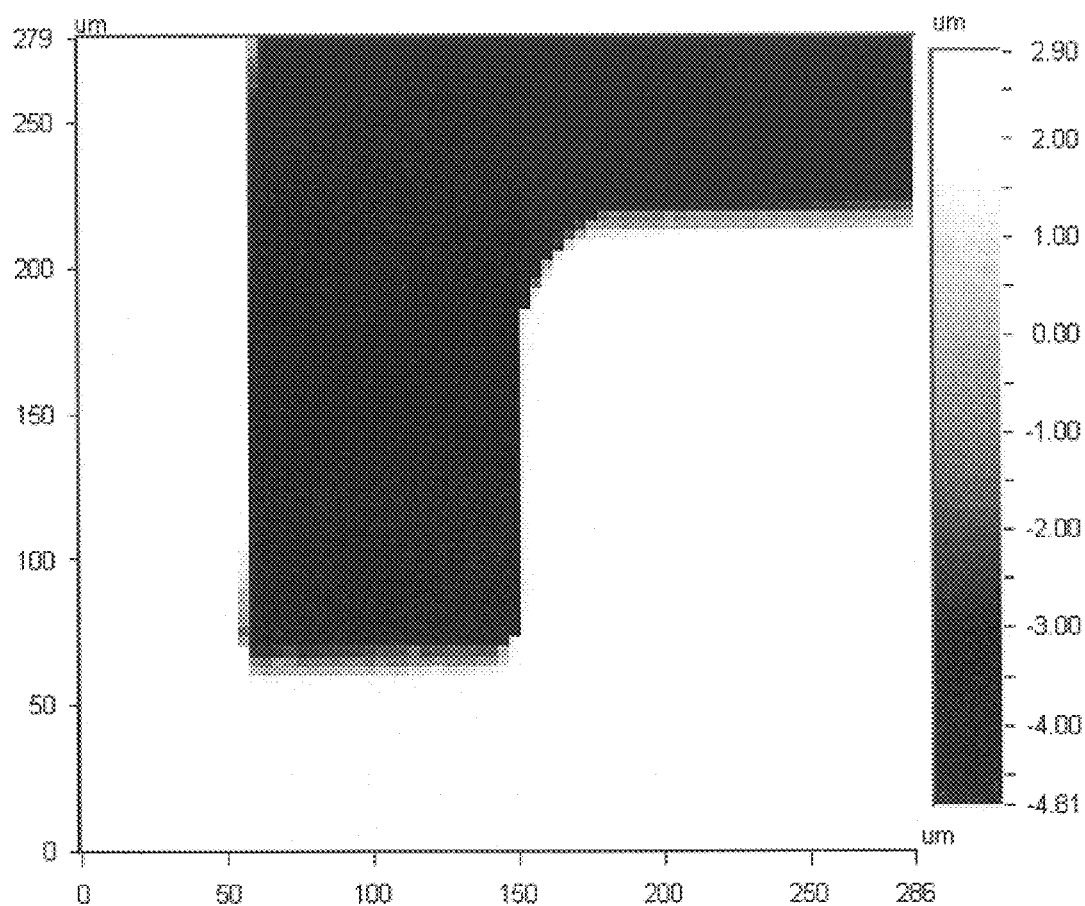
FIG. 10 is a magnified portion of a letter A on a step-height measurement to illustrate the blurring of the edge of the pattern produced by stage misalignment in the y direction.

Similarly, miscalibration of the stage speed causes "washing out" of contours in the direction of scanning. The degree of error depends on the difference between the proper and actual scanning speeds. The direction of motion is preferably collinear with the direction defined by the camera's pixel lines in the detection direction. Any deviation of the direction of motion will result in errors similar to the ones resulting from misalignments between the camera and the sample stage in the y direction. An illustrative example is given in FIG. 10, which is a magnified portion of a letter A on a standard step-height sample showing an appreciable degree of y-direction motion during scanning. The stage/pixel-row misalignment in the y direction produced blurring of the edge of the pattern, causing the vertical edges of the step to be visibly degraded.

The linearity of the stage motion has similar effects on the interferometric results as speed calibration. Random variations of the stage speed result in "washing out" of the edges perpendicular to the direction of the motion. However, usually the inertia of the stage mass smoothes out any jitter or nonlinearity of the stage drive. Thus, no degradation of measurement quality caused by this phenomenon was noted.

Another source of potential error is the vertical drift of the stage along the scanning direction. Any change in height of the stage plane will obviously be reflected in the measurements. So, it is much more important to choose a stage with small vertical drift than to concentrate on repeatability of positioning. It is also possible to take a reference profile of the stage vertical motion by measuring the top of the stage during scanning and subsequently subtracting it from the measurements. As is well understood in the art, some optical aberrations of the interferometer may result in similarly appearing errors (e.g., distortion can cause results similar to stage-speed miscalibration).

LSI is also susceptible to environmental influence, as are other interferometric procedures. Since the system used to test the invention was based on a microscope, like VSI instruments, air convection influence was negligible. on the other hand, conventional VSI instruments are susceptible mostly to vibrations and resonance frequencies. For the most part, these sources of error arise from the fact that VSI requires vertical motion of the object or the scanning head. This configuration is mechanically less stable than the lateral-scanning design of the invention because LSI does not require the vertical-scan mechanism of VSI, which can be replaced by a much more rigid frame with a simple focusing motion. Therefore, the stage component of the LSI instrument introduces much less interference due to vibration and resonance.

Finally, a negative aspect of the LSI approach may be the limited axial scanning range tied to the resolution of the CCD detector along the scanning direction. The total range can be extended by using larger size CCD cameras at the cost, however, of slower acquisition rate. Another solution would be to use an undersampling procedure in which the images are acquired at intervals corresponding to, e.g., 450°. By increasing the tilt of the instrument, denser fringes can be introduced in the field of view to the point where, for example, one and a quarter fringe correspond to one pixel. This technique can extend the scanning range by a factor of five, but at a cost of some decrease in accuracy and repeatability.

Thus, a novel approach to well-known techniques of vertical scanning interferometry is disclosed. In exchange for switching the scanning direction from vertical to lateral and simultaneously tilting the interferometer, several advantages are obtained over the conventional approach. Most importantly, a continuous strip of data can be acquired along the scanning direction. The width of the data set is defined by the imaging properties of the instrument and the field-of-view of the camera in the y direction perpendicular to the stage motion. The length of the data set depends only on the scanning distance; hence, stitching of data along the scanning direction can be avoided. It is also possible to use an imaging system with different magnifications along the x and y directions in order to increase the width of the acquired profile. Significant speed gains are also possible by using a fast camera or a CCD detector with a limited resolution in the x direction while retaining higher resolution in the y direction (e.g., some cameras offer partial scan mode in which only the first 100 or so lines are read from the CCD array at speeds up to 350 fps—see Table 2).

Other measurement techniques, such as PSI, PSI on the fly, etc., using either broadband or narrowband light with conventional VSI or PSI devices, can be adapted for LSI as well. While the present disclosure is based on LSI performed using broadband light, it would be apparent to one skilled in the art that the technique could be used for phase-shifting measurements with narrowband light as well. In such a case, the tilt of the optical axis would produce periodic fringes which, within the usual $2\pi$-ambiguity limitations, could be used to measure phase shifts and corresponding height differences.

LSI can also be combined advantageously with unconventional scanning schemes to measure objects that are otherwise difficult to handle, such as rolls, disks, etc., where a combination of lateral and angular motions can be used. Commercially available profilers equipped with an X-Y stage and tip-tilt heads can be easily converted to LSI use by a simple software upgrade. The critical issues in all instances are the ability to keep the interference patterns produced by the lateral scan within the coherence range of the light used and to track the motion of a point being measured on the test surface with the system's detector, which may require sophisticated geometric transformations related to the particular implementation. By removing vertical scanning modules, the LSI approach requires simpler mechanical construction than conventional scanning systems. In addition, the LSI more rigid design is more resistant to vibration and resonant frequencies. This is especially important in factory environments.

While the invention has been described mostly in terms of scanning the sample stage or fixture with respect to a stationary interferometric objective, it is understood that the same results can be achieved in equivalent manner by scanning the objective in relation to a fixed sample stage. Therefore, the terms scanning and translating should be so interpreted for the purposes of this specification of the invention and appended claims.

Thus, this disclosure is yet another approach to profilometry for improving measurement characteristics such as speed and ease of handling of unconventional parts. At the present state of the art, it has been possible to exploit the new technique in various applications, as disclosed. As progress is made with hardware speed and resolution, the range of applications and capabilities of the method is expected to increase as well.

Various other changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

I claim:

1. An interferometer comprising a light source, a fixture for holding a test surface, an interferometric objective with an optical axis directed toward the fixture at a predetermined tilt angle, a light detector positioned so as to detect an interference pattern produced by a wavefront reflected from the test surface and a wavefront reflected from a reference surface; means for scanning the fixture laterally through the optical axis in order to produce a plurality of interference patterns; and means for performing interferometric analysis on said plurality of interference patterns produced by the test surface as the fixture is scanned.

2. The interferometer of claim 1, wherein said light source is a broad-bandwidth illumination source.

3. The interferometer of claim 2, wherein said means for performing interferometric analysis includes means for carrying out vertical-scanning-interferometry analysis.

4. The interferometer of claim 2, wherein said means for performing interferometric analysis includes means for carrying out phase-shifting-interferometry analysis.

5. The interferometer of claim 2, wherein said light source is a narrow-bandwidth illumination source.

6. The interferometer of claim 5, wherein said means for performing interferometric analysis includes means for carrying out phase-shifting-interferometry analysis.

7. An interferometer comprising a light source, a fixture for holding a test surface, an interferometric objective with an optical axis directed toward the fixture at a predetermined tilt angle, a light detector positioned so as to detect an interference pattern produced by a wavefront reflected from the test surface and a wavefront reflected from a reference surface; means for scanning the fixture laterally through the optical axis in order to produce a plurality of interference patterns; and means for performing interferometric analysis on said plurality of interference patterns produced by the test surface as the fixture is scanned;

wherein said means for carrying out interferometric analysis comprises means for correlating a lateral displacement of a point on the test surface produced by a scan step with a corresponding linear displacement of an image of the point on a surface of the light detector, and further comprises means for tracking a corresponding OPD change for the point resulting from the scan step.

8. The interferometer of claim 7, wherein said light source is a broad-bandwidth illumination source.

9. The interferometer of claim 8, wherein said means for performing interferometric analysis includes means for carrying out vertical-scanning-interferometry analysis.

10. The interferometer of claim 8, wherein said means for performing interferometric analysis includes means for carrying out phase-shifting-interferometry analysis.

11. The interferometer of claim 7, wherein said light detector and fixture are substantially parallel to one another within a field of view of the interferometric objective.

12. The interferometer of claim 7, wherein said light source is a narrow-bandwidth illumination source.

13. The interferometer of claim 12, wherein said means for performing interferometric analysis includes means for carrying out phase-shifting-interferometry analysis.

14. An interferometer comprising a light source, a fixture for holding a test surface, an interferometric objective with an optical axis directed toward the fixture at a predetermined tilt angle, a light detector positioned so as to detect an interference pattern produced by a wavefront reflected from the test surface and a wavefront reflected from a reference surface; means for scanning the fixture laterally through the optical axis in order to produce a plurality of interference patterns; and means for performing interferometric analysis on said plurality of interference patterns produced by the test surface as the fixture is scanned;

wherein said light detector comprises lines of pixels corresponding to a direction of scanning, and the scanning means is adapted to scan the fixture at a velocity producing synchronization between a pixel spacing along said line of pixels and a predetermined phase change in the wavefront reflected from the test surface.

15. The interferometer of claim 14, wherein said tilt angle is selected to produce a phase change of $\pi/2$ for each incremental translation of the fixture corresponding to one pixel spacing in the light detector.

16. A method of profiling a test surface by determining a difference in height between multiple locations on the surface using an interferometric procedure, comprising the following steps:

(a) providing an interferometer comprising a light source, a fixture for holding the test surface, an interferometric objective with an optical axis directed toward the fixture, and a light detector positioned so as to detect an interference pattern produced by light reflected from the test surface and from a reference surface;

(b) tilting the objective's optical axis with respect to the fixture;

(c) scanning the fixture laterally to produce a plurality of interference patterns; and (d) performing interferometric analysis of the interference patterns produced in step (c).

17. The method of claim 16, wherein said light source is a broad-bandwidth illumination source with a coherence length; and said step (c) includes scanning the fixture through a point of maximum coherence within the coherence length of the light source.

18. The method of claim 16, wherein said light source is a narrow-bandwidth illumination source and said step (d) includes performing phase-shifting-interferometry analysis of the interference patterns produced in step (c).

19. A method of profiling a test surface by determining a difference in height between multiple locations on the surface using an interferometric procedure, comprising the following steps:

(a) providing an interferometer comprising a light source, a fixture for holding the test surface, an interferometric objective with an optical axis directed toward the fixture, and a light detector positioned so as to detect an interference pattern produced by light reflected from the test surface and from a reference surface;

(b) tilting the objective's optical axis with respect to the fixture;

(c) scanning the fixture laterally to produce a plurality of interference patterns; and (d) performing interferometric analysis of the interference patterns produced in step (c);

wherein said step (d) comprises the step of correlating a lateral displacement of a point on the test surface produced by step (c) with a corresponding linear displacement of an image of the point on a surface of the light detector, and further comprises the step of tracking a corresponding OPD change for the point resulting from the scanning step.

20. The method of claim 19, wherein said light source is a broad-bandwidth illumination source with a coherence length; and said step (c) includes scanning the fixture through a point of maximum coherence within the coherence length of the light source.

21. The method of claim 20, wherein said step (d) comprises performing vertical-scanning-interferometry analysis of the interference patterns produced in step (c).

22. The method of claim 19, wherein said step (d) comprises performing phase-shifting-interferometry analysis of the interference patterns produced in step (c).

23. The method of claim 19, wherein said light source is a narrow-bandwidth illumination source and said step (d) includes performing phase-shifting-interferometry analysis of the interference patterns produced in step (c).

24. The method of claim 19, wherein said light detector and fixture are maintained substantially in parallel to one another within a field of view of the interferometric objective.

25. A method of profiling a test surface by determining a difference in height between multiple locations on the surface using an interferometric procedure, comprising the following steps:

a providing an interferometer comprising a light source, a fixture for holding the test surface, an interferometric objective with an optical axis directed toward the fixture, and a light detector positioned so as to detect an interference pattern produced by light reflected from the test surface and from a reference surface;

(b) tilting the objective's optical axis with respect to the fixture;

(c) scanning the fixture laterally to produce a plurality of interference patterns; and (d) performing interferometric analysis of the interference patterns produced in step (c);

wherein said light detector comprises lines of pixels corresponding to a direction of scanning, and step (c) is carried out scanning the fixture at a velocity producing synchronization between a pixel spacing along said line of pixels and a predetermined phase change in the wavefront reflected from the test surface.

26. The method of claim 25, wherein said tilt angle is selected to produce a phase change of $\pi/2$ for each incremental translation of the fixture corresponding to one pixel spacing in the light detector.

27. A method of profiling a test surface by determining a difference in height between multiple locations on the surface using an interferometric procedure, comprising the following steps:

(a) providing an interferometer comprising a light source, a fixture for holding the test surface, an interferometric objective with an optical axis directed toward the fixture, and a light detector positioned so as to detect an interference pattern produced by light reflected from the test surface and from a reference surface;

(b) tilting the objective's optical axis with respect to the fixture;

(c) scanning the fixture through a point of maximum coherence within the coherence length of the light source; and (d) performing interferometric analysis of the interference patterns produced by the test surface as the fixture is scanned.

* * * * *